US006726397B2

(12) United States Patent
Kuehn et al.

(10) Patent No.: US 6,726,397 B2
(45) Date of Patent: Apr. 27, 2004

(54) INTERLOCKING DEVICE

(75) Inventors: Kurt Kuehn, Des Plaines, IL (US);
James Zielinski, Schaumburg, IL (US);
David Lakickas, Chicago, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 71 days.

(21) Appl. No.: 09/991,297

(22) Filed: Nov. 9, 2001

(65) Prior Publication Data

US 2003/0091385 A1 May 15, 2003

(51) Int. Cl.[7] .................................................. F16B 2/00
(52) U.S. Cl. ..................... 403/367; 403/326; 403/360; 403/381; 211/186; 248/250
(58) Field of Search .................................. 108/180, 186, 108/157.16, 158.12; 248/224.51, 224.61, 250; 403/326, 327, 329, 330, 353, 360, 367, 381, 365, 366, 368, 331, 373, 374.1, 409.1; 211/186, 153

(56) References Cited

U.S. PATENT DOCUMENTS 971,226 A * 9/1910 Turner ..................... 248/219.2
3,403,641 A * 10/1968 Baker ......................... 108/152
4,220,305 A    9/1980 Pollard
4,724,998 A    2/1988 Long et al.
4,735,391 A    4/1988 Lawrence
5,297,486 A    3/1994 Herrmann et al.
5,406,894 A    4/1995 Herrmann et al.
5,489,162 A    2/1996 LoCicero et al.
5,709,057 A * 1/1998 Johnson, Jr. et al. ......... 52/301
5,762,441 A * 6/1998 Karlsen et al. ............. 403/381
6,004,065 A   12/1999 Higdon et al.
6,186,456 B1   2/2001 Marsh
6,497,395 B1 * 12/2002 Croker ....................... 248/300

FOREIGN PATENT DOCUMENTS

EP          527 658        2/1993

* cited by examiner

Primary Examiner—Lynne H. Browne
Assistant Examiner—Michael P. Ferguson
(74) Attorney, Agent, or Firm—Pauley Petersen & Erickson

(57) ABSTRACT

An interlocking device for connecting a shelf, drawer or similar component with respect to a frame preferably includes a mateable support and receiver. The support includes a groove extending at least partially through the support and a support ramp positioned on the support. The receiver preferably includes a protruding head and a receiver ramp positioned on the protruding head, the receiver ramp lockably engageable with the support ramp within the support.

19 Claims, 4 Drawing Sheets

INTERLOCKING DEVICE

BACKGROUND OF THE INVENTION

1. Field of the Invention

This invention relates to an interlocking device, such as for a drawer or shelf support, having two mating components for engaging an adjustable element, such as a shelf, with a fixed element, such as a housing.

2. Description of Related Art

Interlocking devices, such as shelf supports, are used to engage a moveable element, such as a shelf, with a fixed element, such as a housing. Prior art shelf support devices often use hooks and grooves, pegs and holes or similar arrangements to engage the moveable element with the fixed element.

Many prior art interlocking devices, particularly of the type described above, require directional engagement between the moveable element and the fixed element and lack a positive indication of engagement which would give a user confidence that the moveable element is fully engaged with the fixed element.

SUMMARY OF THE INVENTION

It is one object of this invention to provide an interlocking device for mating an adjustable element with respect to a fixed element.

It is another object of this invention to provide an interlocking device having a support and a receiver that positively engage with respect to one another.

It is yet another object of this invention to provide an interlocking device that may be configured to permit sliding engagement from one or more directions.

An interlocking device, such as a shelf lock, according to a preferred embodiment of this invention preferably includes a support and a corresponding receiver which are mateably engageable with one another. According to one preferred embodiment of this invention, the receiver is preferably connected with respect to a fixed element and the support is preferably connected with respect to a moveable and/or adjustable element. Alternatively, the roles of the support and the receiver may be reversed.

The support preferably includes a groove extending at least partially through the support. The support additionally includes one or more support ramps positioned within the groove.

The interlocking device further includes a corresponding receiver which is mateable with respect to the support. The receiver preferably includes a protruding head which extends from the receiver as an eighth turn. A receiver ramp is positioned on the protruding head and is preferably similarly configured to the support ramp and thereby lockably engageable with respect to the support ramp within the support. The receiver ramp may comprise two adjacent ramps forming a mating recess between them which positively receives the support ramp within the support.

Because of the ramped configuration of the engagement mechanism, the receiver provides increased resistance to engagement with the support as the groove of the support is moved across the protruding head of the receiver. Therefore, an audible click or positive engagement is felt between the support and the receiver when the support ramp is securely engaged with respect to the receiver ramp.

According to another preferred mating configuration of this invention, the receiver ramp includes a first ramp bisecting a second ramp, the first ramp arranged perpendicularly with respect to the second ramp to form a symmetrical cruciform shape. The support in this arrangement includes two support ramps and an intermediate mating recess for engagement with either the first ramp or the second ramp depending upon the orientation of the support relative to the receiver.

Depending upon the particular embodiment, the support is slidably engageable with the receiver from between one and four separate directions, arranged at either a single fixed location or at 90° increments or 180° increments. These arrangements enable the support to be attached to the receiver from the top or bottom only; from the top and the bottom; or from the top, bottom or either side, all depending upon the desired application.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Interlocking device 10 according to two preferred embodiments of this invention is shown in FIGS. 1–7. According to this specification and claims, interlocking device 10 may comprise a shelf or drawer support. For the purposes of this specification, applicant shall use "shelf support" and "shelf support device" to illustrate one preferred embodiment of this invention although other applications that require two or more interlocking components are contemplated by this invention and by the term "shelf support." Shelf support device 10 preferably includes one or more components that are formed or molded using techniques known to those having ordinary skill in the art, such as injection molding.

Shelf support device 10 preferably includes shelf support 20 and a corresponding receiver 40 which is mateably engageable with shelf support 20. Receiver 40 is preferably connected with respect to a fixed element 100 such as a frame, furniture, appliance or other infrastructure and shelf support 20 is preferably, though not necessarily, connected with respect to a moveable element such as a shelf, hook, support or other similar member that may be removeably connected with respect to receiver 40 and thereby the fixed element.

Figure 1:
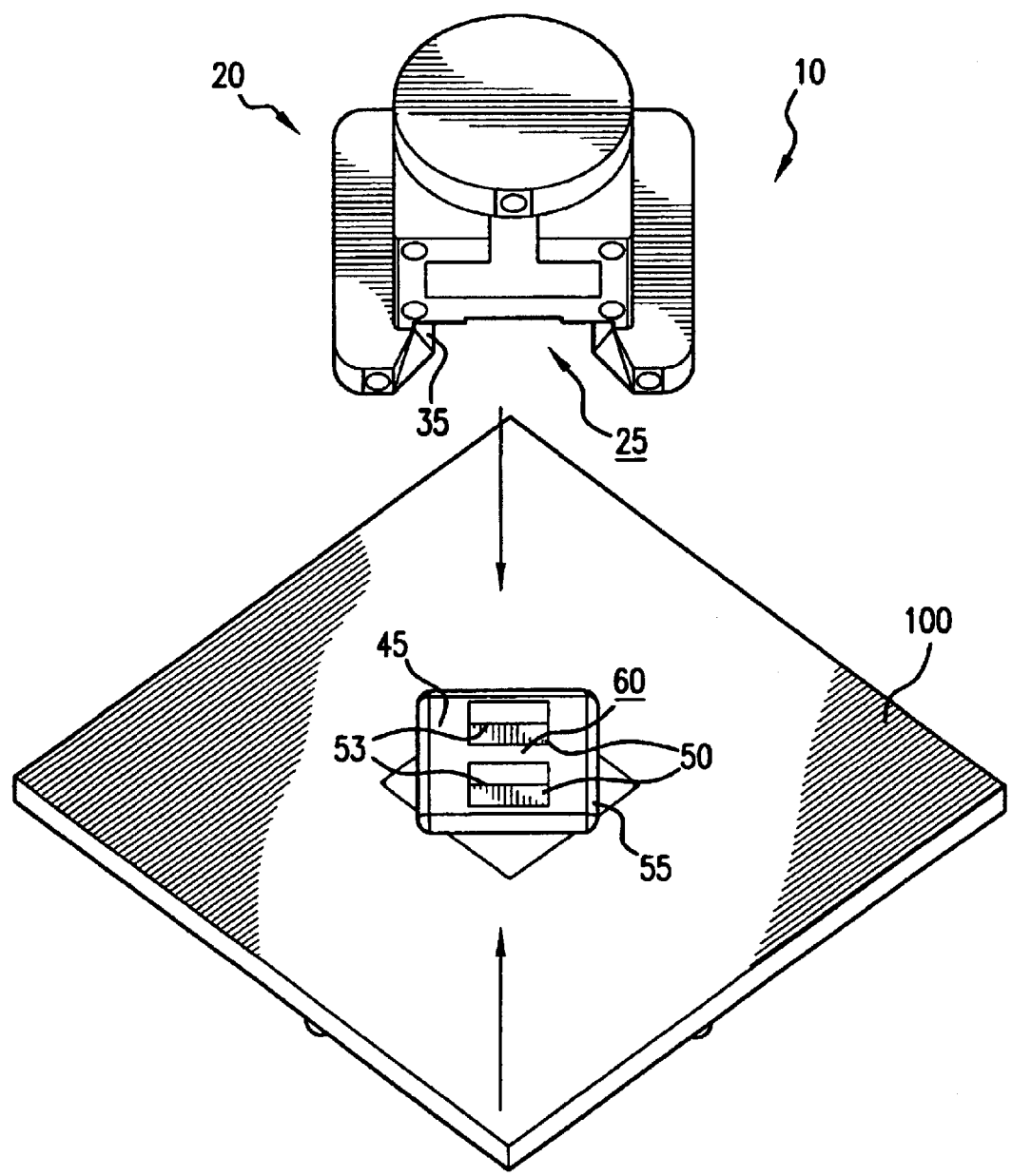
FIG. 1 is a front perspective view of an interlocking device according to one preferred embodiment of this invention.

According to one preferred embodiment of this invention, shelf support 20 preferably includes groove 25 extending at least partially through shelf support 20. Groove 25 preferably extends partially through shelf support 20 such that shelf support 20 is enclosed on three sides. As shown in FIG. 1, shelf support 20 may include a plurality of internal beveled edges 35 forming groove 25.

Shelf support 20 additionally includes one or more support ramps 30 positioned therein. Support ramp 30 is preferably integrally formed with shelf support 20 and includes apex 33.

In addition to shelf support 20, shelf support device 10 preferably includes receiver 40 which is mateable with respect to shelf support 20. According to one preferred embodiment of this invention, receiver 40 has protruding head 45. Protruding head 45 preferably extends from receiver 40 in an eighth turn arrangement whereby a base of protruding head 45 is out of alignment with respect to receiver 40 and protruding head 45, as particularly shown in FIG. 1.

As further shown in FIG. 1, protruding head 45 may additionally form a plurality of external beveled edges 55 corresponding with the three internal beveled edges 35 in shelf support 20. Such an arrangement of beveled edges 35, 55 assists in forming a positive engagement between shelf support 20 and receiver 40.

According to a preferred embodiment of this invention, receiver ramp 50 is positioned on protruding head 45. Receiver ramp 50 is preferably similarly configured to support ramp 30 and thereby lockably engageable with respect to support ramp 30 within shelf support 20.

Receiver ramp 50 may comprise two adjacent ramps forming a mating recess 60 between them, mating recess 60 engageable with support ramp 30 within shelf support 20. According to this embodiment, shelf support 20 is engageable with receiver 40 from two different directions arranged approximately 180° with respect to each other, for example as indicated by the directional arrows shown in FIG. 1. This enables shelf support 20 to be installed on receiver 40 from the top or the bottom.

Figure 2:
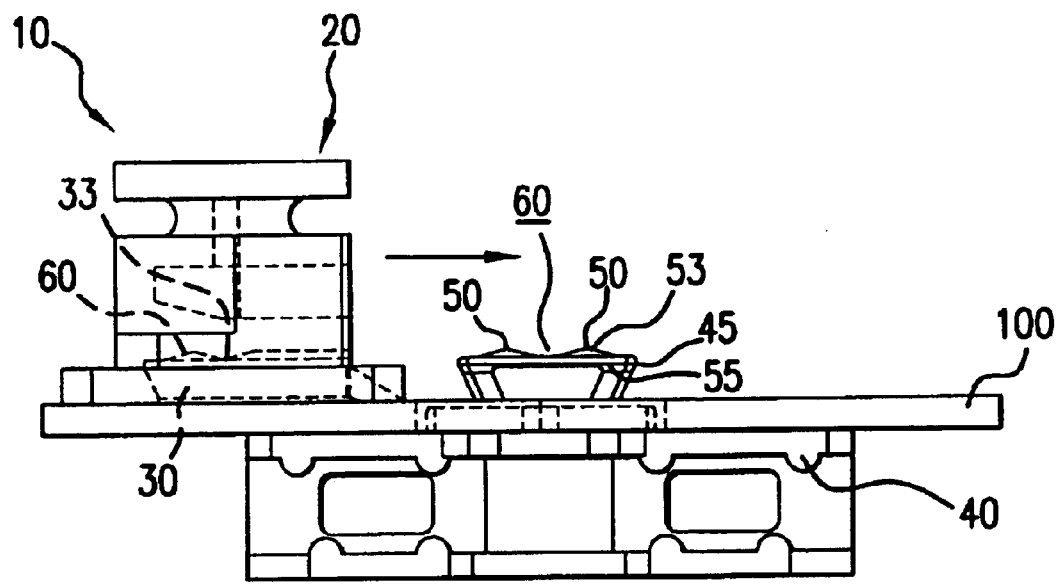
FIG. 2 is a side view of an interlocking device in a first position according to one preferred embodiment of this invention.
Figure 3:
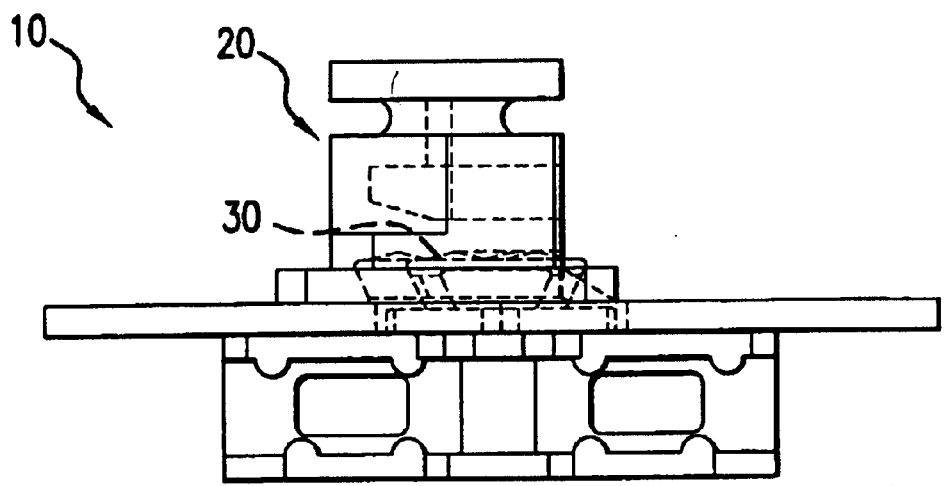
FIG. 3 is a side view of the interlocking device shown in FIG. 2 in a second position.
Figure 4:
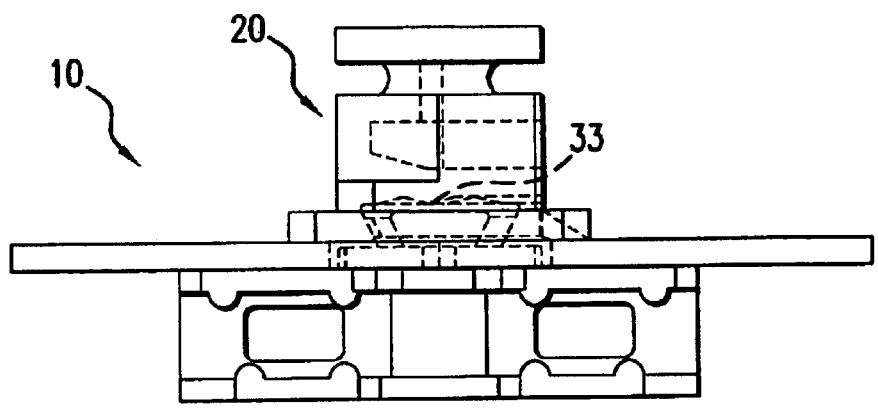
FIG. 4 is a side view of the interlocking device shown in FIG. 2 in a third position.

According to one preferred embodiment of this invention shown in FIGS. 2–4, support ramp 30 forms at least one mating recess 60 engageable with apex 53 of receiver ramp 50. In addition, receiver ramp 50 may include a pair of adjacent ramps forming mating recess 60 between them wherein support ramp 30 of shelf support is engageable with mating recess 60. Preferably support ramp 30 within shelf support 20 is oriented in the same direction as one or more receiver ramps 50 on receiver 40.

Figure 5:
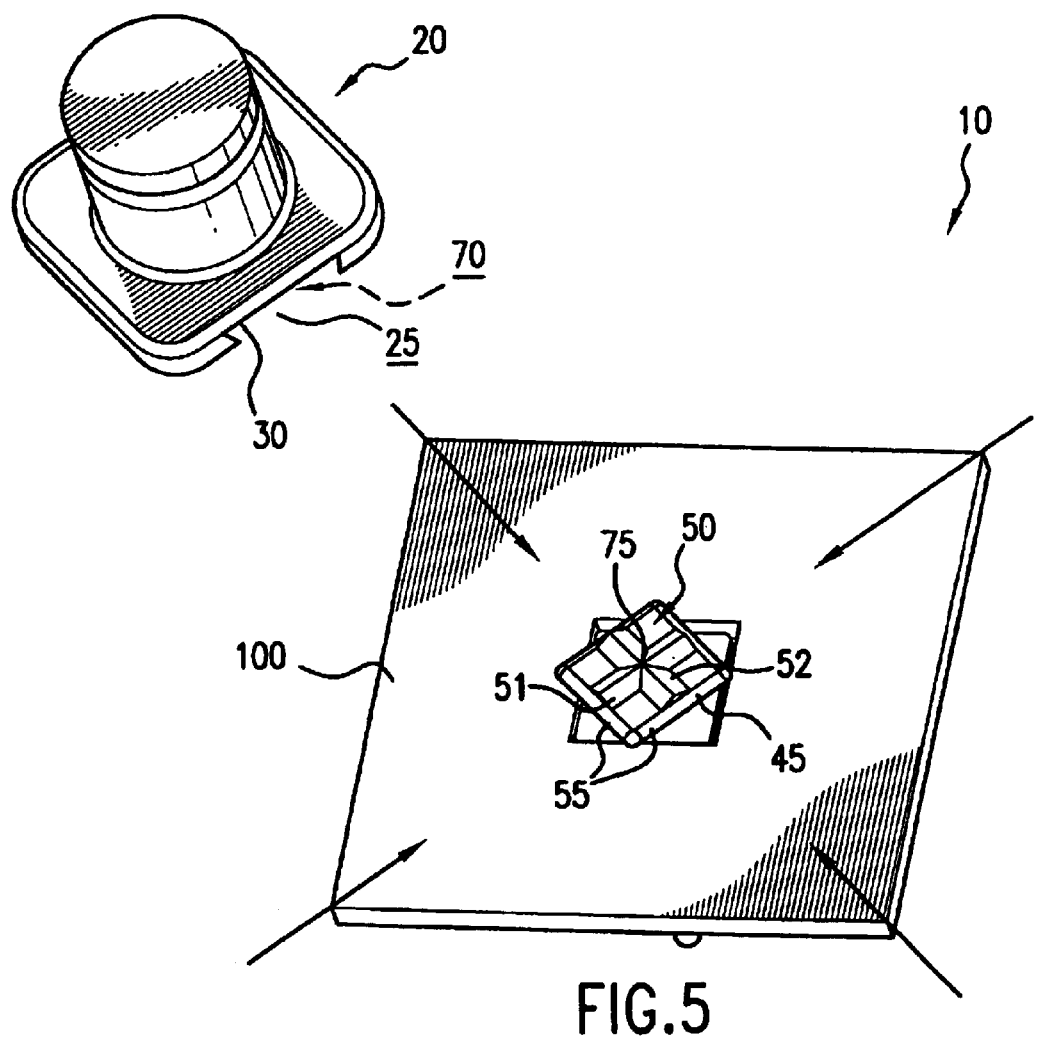
FIG. 5 is a front perspective view of an interlocking device according to one preferred embodiment of this invention.
Figure 6:
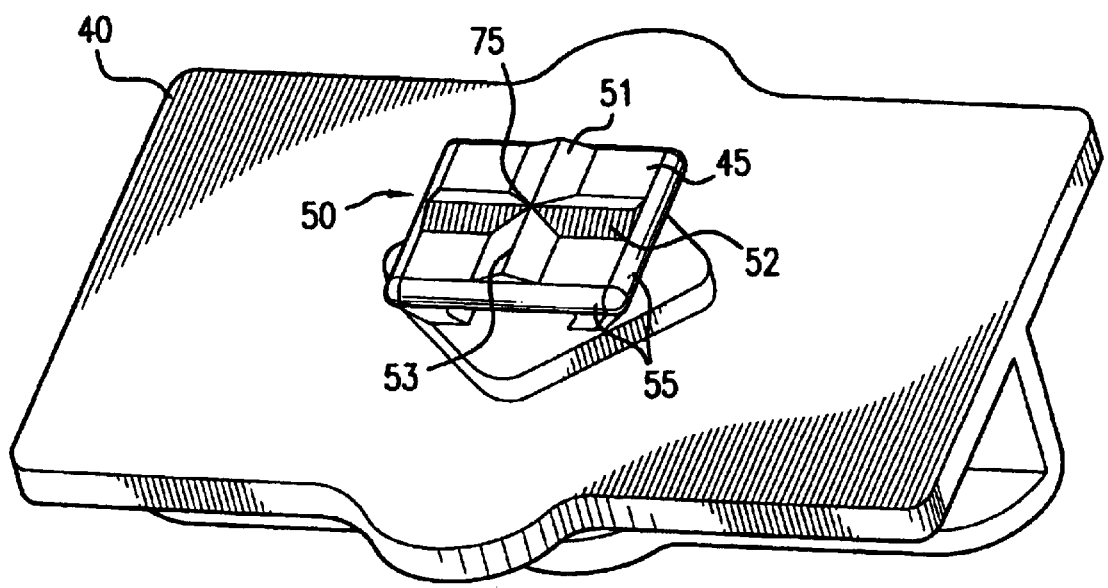
FIG. 6 is a front perspective view of a receiver according to one preferred embodiment of this invention.
Figure 7:
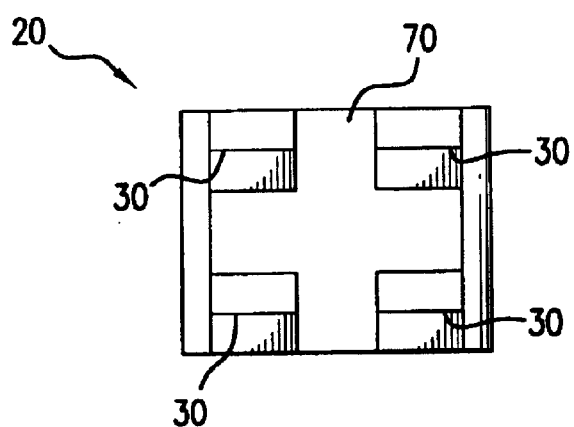
FIG. 7 is a bottom view of a support according to one preferred embodiment of this invention.

According to another preferred mating configuration shown in FIGS. 5–7, receiver ramp 50 includes first ramp 51 bisecting second ramp 52, first ramp 51 arranged perpendicularly with respect to second ramp 52. According to this preferred embodiment, shelf support 20 includes two support ramps 30 and an intermediate mating recess 60 for engagement with one of first ramp 51 or second ramp 52 depending upon the orientation of shelf support 20 relative to receiver 40. In this preferred embodiment, shelf support 20 further includes clearance gap 70 arranged within support ramp 30 having a width sufficient to permit clearance of a bisected portion 75 of first ramp 51 and second ramp 52.

As arranged, the embodiment shown in FIGS. 5 and 6 permits sliding engagement between shelf support 20 and receiver 40 from any of four separate directions, arranged at approximately 90° increments. This arrangement enables shelf support 20 to be attached to receiver 40 from the top, from the bottom or from either side depending upon the desired application, for example as shown in the directional arrows in FIG. 5.

According to a preferred embodiment of this invention, receiver 40 provides increased resistance to engagement with shelf support 20 as groove 25 of shelf support 20 is slid over protruding head 45 of receiver 40. For example, FIG. 2 shows shelf support 20 prior to engagement between groove 25 and protruding head 45 of receiver 40 wherein no resistance is offered between the two components. FIG. 3 shows shelf support 20 engaged with receiver 40 such that support ramp 30 is providing resistance against receiver ramp 50. Once such resistance is overcome, shelf support 20 is fully and positively engaged with receiver 40, such as shown in FIG. 4. As a result, when support ramp 30 is fully engaged with respect to receiver ramp 50, an audible click is heard and/or a positive engagement is felt between shelf support 20 and receiver 40.

While in the foregoing specification this invention has been described in relation to certain preferred embodiments thereof, and many details have been set forth for purpose of illustration, it will be apparent to those skilled in the art that the shelf support device according to this invention is susceptible to additional embodiments and that certain of the details described herein can be varied considerably without departing from the basic principles of the invention.

We claim:

1. An interlocking device comprising:
    a support having a groove extending at least partially through the support;
    a support ramp positioned on the support;
    a receiver having a protruding head; and
    a receiver ramp positioned on and extending from the protruding heady the receiver ramp lockably engageable with the support ramp within the support, wherein the receiver ramp comprises two perpendicular ramps extending upwardly from the protruding head a first of the two perpendicular ramps bisecting a second of the two perpendicular ramps, the two perpendicular ramps engageable with the support ramp within the support.

2. The interlocking device of claim 1 wherein the support ramp forms at least one mating recess engageable with the receiver ramp.

3. The interlocking device of claim 1 wherein the support includes a plurality of internal beveled edges forming the groove.

4. The interlocking device of claim 3 wherein the protruding head forms a plurality of external beveled edges corresponding with the plurality of internal beveled edges in the support.

5. The interlocking device of claim 1 wherein the support ramp within the support is oriented in the same direction as the receiver ramp on the receiver.

6. An interlocking device comprising:
    a support having an internally formed groove and a support ramp positioned within the groove; and
    a receiver having a protruding head and a pair of bisecting receiver ramps positioned perpendicularly with respect to each other on a top of the protruding head, the receiver ramps separately engageable with the support ramp.

7. The interlocking device of claim 6 wherein the groove includes a plurality of internally beveled edges that mate with a corresponding plurality of beveled edges positioned on the protruding head.

8. The interlocking device of claim 6 wherein the support is engageable with the receiver from four distinct directions in increments of approximately 90°.

9. The interlocking device of claim 6 comprising a shelf support.

10. The interlocking device of claim 6 wherein the receiver provides progressively more resistance as the support is slid along the receiver until the support ramp of the support is fully engaged with the mating recess of the receiver.

11. An interlocking device comprising:
   a support having an internally formed groove and a support ramp positioned within the groove;
   a receiver having a protruding head; and
   a first ramp and a second ramp arranged perpendicularly with respect to each other on a top of the protruding head so that the first ramp bisects the second ramp, the first ramp and the second ramp separately engageable with the support ramp.

12. The interlocking device of claim 11 wherein the support ramp further includes a clearance gap arranged to permit passage of a bisected portion of the first ramp and the second ramp.

13. The interlocking device of claim 11 wherein the support is engageable with the receiver from four distinct directions in increments of approximately 90°.

14. The interlocking device of claim 11 wherein the receiver provides increased resistance to engagement with the support until the support ramp is engaged with respect to one of the first ramp and the second ramp.

15. The interlocking device of claim 11 comprising a shelf support.

16. An interlocking device comprising:
   a support having a groove extending at least partially through the support;
   a support ramp positioned on the support;
   a receiver having a protruding head; and
   a receiver ramp positioned on the protruding head, the receiver ramp lockably engageable with the support ramp within the support, the receiver ramp further including a first ramp bisecting a second ramp, the first ramp arranged perpendicularly with respect to the second ramp.

17. The interlocking device of claim 16 wherein the support further comprises a clearance gap arranged in the support ramp, the clearance gap having a width sufficient to permit clearance of a bisected portion of the first ramp and the second ramp.

18. The interlocking device of claim 16 wherein die support is engageable with the receiver from four distinct directions in increments of approximately 90°.

19. An interlocking device comprising:
   a support having an internally formed groove and a support ramp positioned within the groove;
   a receiver having a protruding head; and
   a first ramp and a second ramp arranged perpendicularly with respect to each other on the protruding head, the first ramp and the second ramp separately engageable with the support ramp, wherein the support ramp further includes a clearance gap arranged to permit passage of a bisected portion of the first ramp and the second ramp.

* * * * *